United States Patent Office 3,046,723
Patented July 31, 1962

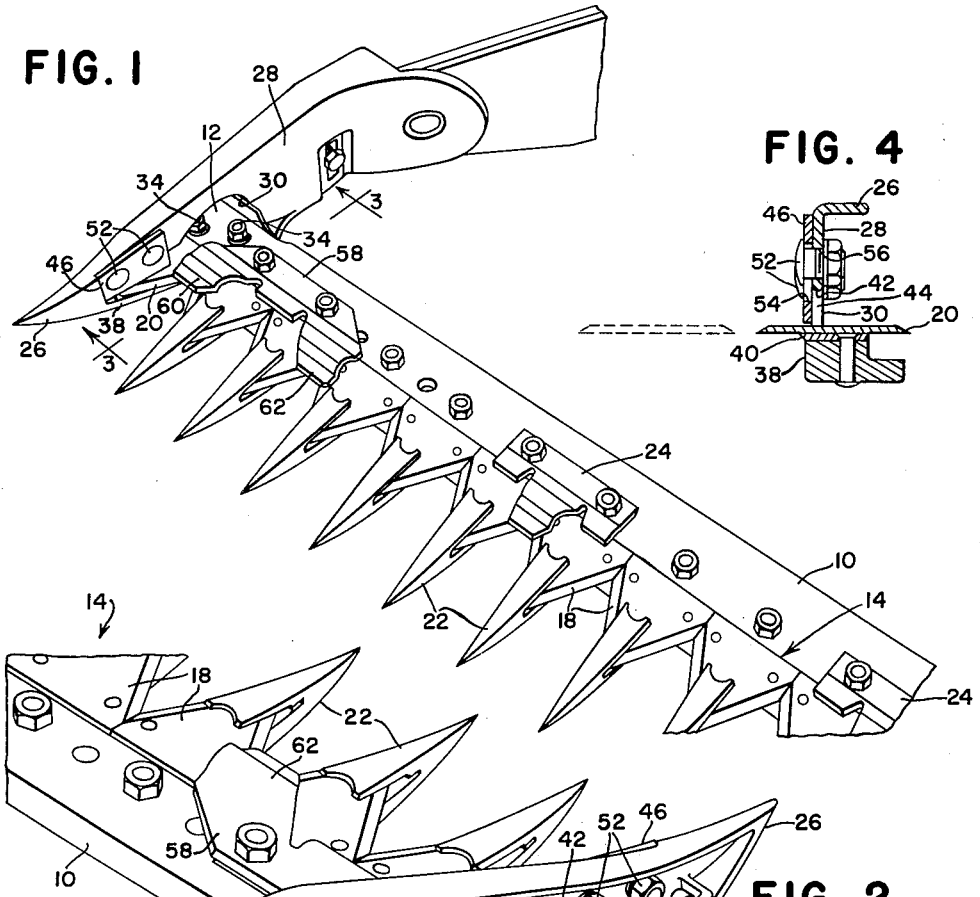
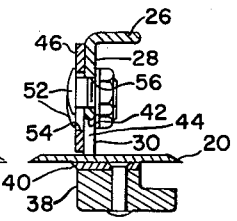
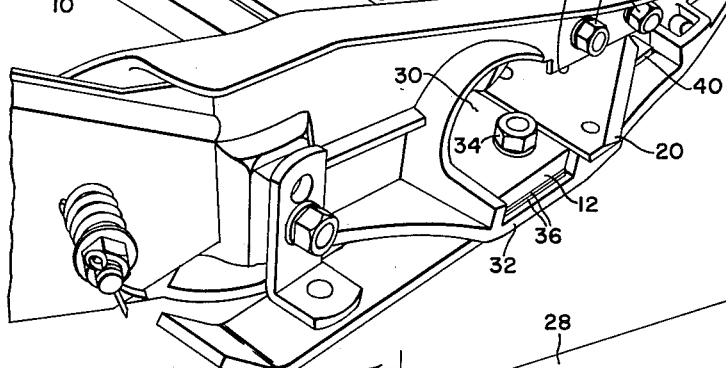
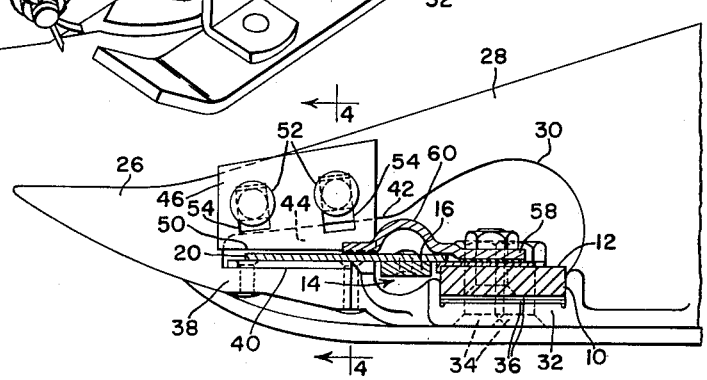

3,046,723
NON-CLOGGING OUTER SHOE FOR MOWERS
William A. Young, East Moline, and Ellsworth T. Johnson, Moline, Ill., assignors to Deere & Company, Moline, Ill., a corporation of Delaware
Filed Mar. 7, 1960, Ser. No. 13,011
5 Claims. (Cl. 56—314)

This invention relates to cutting apparatus for mowers and more particularly to an improved outer shoe arrangement in which provision is made for eliminating the problem of clogging which so often occurs in cutting apparatus.

Those versed in the art are familiar with the reciprocating type of sickle in which the sickle is carried lengthwise of a cutter bar and includes a plurality of forwardly extending sections which cooperate with guards or with other sections. The length of the cutter bar determines the swath that will be cut and the outer shoe is the outer extremity of the bar. Consequently, vegetation to one side of the outer shoe is being cut and that at the other side is not being cut. The outermost section on the sickle conventionally projects through an opening in the outer shoe, which opening is also provided with means for mounting the shoe on the outer end of the cutter bar. It is in this area that the vegetation becomes tangled, resulting in clogging of the opening and consequent stoppage of the operation of the sickle. The reasons for the clogging are as varied as the types of vegetation that can be handled by a mower. In some grasses, which are wiry, for example, the clogging results from peculiarities of that crop as distinguished from grasses which, for example, are tough but pliable.

The solutions for the clogging problem have heretofore been more numerous than successful, and one of those most recently offered to the industry is that in which the outer shoe is provided with an opening of minimum area consistent with accommodation of the outer sickle section and the outer end of the cutter bar. In still other instances, the sickle is provided with an additional section or half section which is supposed to operate on the theory that it will cut the vegetation outwardly of the outer shoe. However, experience has shown that although some of these designs operate in some crop conditions, they are failures in others.

According to the present invention, an improved non-clogging outer shoe is provided which is adaptable to a wide variety of crop conditions, a significant feature of same being that the outer shoe has an opening therein for accommodating the outer end of the mower bar as well as the outermost or outer end section of the sickle, together with a filler member mounted in the opening by means providing for the adjustment thereof to relate a bottom edge of the filler member with the top surface of the outer sickle section. Therefore, the size of the opening in the critical area can be adjusted at will and in those cases in which extreme or close clearances are required, the filler member can be adjusted to suit, and in other cases where the opening must be wider, again adjustment is available. Moreover, the outer sickle section cooperates with a ledger plate or equivalent element on the outer shoe and very often manufacturing tolerances vary to such extent that it is difficult to adjust this relationship while still maintaining the relationship between the outer sickle section and an opening of permanent area. This, in combination with means for adjusting the outer end of the cutter bar vertically relative to the outer shoe in the mounting and assembly thereof causes such changes in relationship between the several components as to require adjustability if the outer shoe is to operate satisfactorily in conjunction with the other components.

A further object of the invention is to provide hold-down means mounted on the cutter bar and cooperative with the sickle sections in such manner as to further improve the shearing or cutting relationship between the outer sickle section and the ledger element of the outer shoe, this means preferably incorporating a pair of spaced hold-down fingers, one operating in conjunction with the outer sickle section and thus proximate to the outer shoe and the other operating in conjunction with the sickle in an area spaced inwardly from the first mentioned location.

The foregoing and other important objects and desirable features inherent in and encompassed by the invention will become apparent as a preferred embodiment thereof is disclosed in detail in the ensuing description and accompanying sheet of drawings, the several figures of which are described below.

FIG. 1 is a perspective of the outer end portion and shoe assembly of a typical mower cutter bar and sickle equipped with the improvement provided by this invention.

FIG. 2 is a perspective, on a scale somewhat enlarged over that of FIG. 1, showing the appearance of the structure from the outer side.

FIG. 3 is a section on an enlarged scale as seen generally along the line 3—3 of FIG. 1.

FIG. 4 is a section on the line 4—4 of FIG. 3.

A typical transversely extending mower or cutter bar is shown at 10 as having an outer end 12 and as carrying for reciprocation thereof and lengthwise along the front end thereof a sickle indicated in its entirety by the numeral 14. The sickle comprises a conventional knife back 16 to which are rigidly secured in any suitable manner a plurality of sickle sections 18, the outermost one of which is designated by the numeral 20 for purposes of distinction. The sickle sections 18 cooperate in conventional fashion with a plurality of mower guards 22 rigidly carried by and projecting forwardly from the mower bar. A plurality of hold-down means 24 is used to guide and control the sickle relative to the cutter bar. The relationship of the knife back 16 to the cutter bar 10 and the mounting thereof is conventional, as best seen in FIG. 3.

The improvement provided according to the present invention resides in an outer shoe 26 which, in general configuration, is similar to conventional shoes, and is provided at the outer end of the shoe to divide the vegetation between the swath being cut and that not being cut. The shoe is preferably a casting and has a fore-and-aft upright wall 28 which is provided with a relatively large opening 30 shaped as best shown in FIGS. 1 and 3. The rear lower portion of the shoe that borders the bottom of the opening 30 provides a mounting pad 32 on which the outer end 12 of the bar rests. The bar-to-shoe connection is effected by any suitable securing means, here represented by a pair of countersunk bolts 34. For the purpose of providing for vertical adjustment between the outer end of the bar 10 and the mounting pad 32, adjustment means may be used, which here take the form of a plurality of shims 36, which may be varied as to number and/or thickness to accomplish the necessary adjustment.

A lower forward portion of the shoe that borders the opening 30 affords a support 38 which is similar in general nature and function to the conventional guards 22 and to this extent the support portion 38 carries thereon a ledger element 40 with which the outer cutting edge of the outer sickle section 20 cooperates in shearing relationship as the sickle reciprocates. The position of the outer sickle section 20 at approximately the outermost portion of the stroke of the sickle is shown in full lines in FIG. 4, and the dotted lines represent the position of the sickle section 20 at the inner end of the reciprocating stroke.

It is thus apparent, as viewed in FIGS. 1 and 3, that the outer sickle section 20 overlies the ledger element 40 and this sickle section as well as the outer end 12 of the cutter bar 10 are accommodated by the opening 30, which is preferably shaped as shown so that the rear portion thereof is relatively large and the forward portion is relatively smaller, being defined by an upper forward portion of the shoe as a bordering edge 42 which, nevertheless, is spaced a substantial vertical distance above the top surface of the outer sickle section to provide what may be regarded as a clearance gap 44. Shoes with outer openings having the general configuration shown have been used for many years, but with the increasing use of mowers in vegetation of different types, clogging problems occur that were not heretofore encountered. As outlined above, some attempts have been made to eliminate these problems by reducing the size of the opening, particularly in the area of the outer sickle section. However, as also pointed out, this solution is at best limited to a few types of crop and is not a universal solution.

According to the present invention, the size of the clearance gap 44 between the shoe and the sickle section 20 is made adjustable by the provision of a filler element in the form of a plate 46 which is juxtaposed along the inner face of the shoe wall 28. This plate has a lower fore-and-aft horizontal edge 50 which may lie parallel to the outer sickle section 20. FIG. 3 shows one phase of the mounting of the plate 46, the vertical position of which may be changed at will because of the provision of adjustable mounting means therefor. In this case, this means takes the form of a pair of bolts 52 which are passed through registering apertures in the plate and shoe wall 28. Each aperture in the plate is in the form of a vertically elongated slot 54, and each aperture in the shoe is simply a hole 56 through which the respective bolt is inserted.

One reason for the adjustability of the plate or filler member 46 has already been outlined; namely, to vary the relationship between the lower edge 50 of the plate and the top surface of the outer sickle section 20 as respects the clogging problem. Another purpose for the adjustability is that as the relationship of the outer end 12 of the cutter bar 10 to the shoe 26 is changed because of differences in the number or thicknesses or shims at 36 varies, the relationship between the sickle and ledger element 40 may change; although, normally the adjustment via the shims 36 will be accomplished so as to maintain the proper relationship between the sickle section 20 and ledger element 40. However, manufacturing tolerances will vary and a permanent pad at 32, without the provision for shims, may cause misalinement in the critical area between the sickle section 20 and its cooperating ledger element 40. Moreover, differences in the relationship between the supporting portion 38 and pad 32 will cause variations in the related components and accordingly the adjustment becomes desirable. Other factors that may change this relationship include differences in thickness of the ledger element 40. For example, a replacement ledger element may have a different thickness than the one replaced, and this is particularly true where the adjustment has been changed to accommodate wear in the original or replaced ledger element.

Another aspect of the invention which contributes toward the maintenance of the proper relationship in the critical area noted is the provision of additional hold-down means, designated in its entirety by the numeral 58. This means is similar to those previously described at 24 except that it is a double means, having a pair of forwardly extending fingers 60 and 62. The finger 60 engages the sickle from above in a location closely proximate to the outer shoe 26, and the other finger 62 engages the sickle from above at a location inwardly from the first-mentioned location. The location of the finger 62 is approximately that which would be occupied by a single hold-down means similar to that at 24 and which have been previously used in cutter bars not equipped with the present invention. Accordingly, the double hold-down means 58 serves its former function as well as an additional function relative to the outer sickle section 20.

Features and advantages, other than those outlined herein, will readily occur to those versed in the art, as will many modifications and alterations in the preferred embodiment disclosed, all of which may be achieved without departure from the spirit and scope of the invention.

What is claimed is:

1. In a mower having a transversely extending mower bar including an outer end and a sickle paralleling and mounted for reciprocation lengthwise of the bar and having a plurality of sickle sections projecting ahead of the bar and including an outer section proximate to the outer end of the bar, the improvement comprising: an outer shoe at the outer end of the bar and having an upright fore-and-aft wall provided with an opening accommodating the outer end of the bar and the outer sickle section, said opening being so shaped that a lower portion of the shoe bordering said opening provides a rear pad on which the outer end of the bar rests and further provides a support ahead of said pad; a forward ledger element on said support and over which the outer sickle section lies for shearing cooperation with said element as the sickle reciprocates, said opening being further so shaped that an upward forward portion of the wall is spaced a substantial distance above the top of the outer sickle section to provide a relatively large clearance gap for said outer sickle section; means securing the outer end of the bar to the aforesaid pad; a filler member juxtaposed on the wall in closing relation to said gap and having a lower fore-and-aft edge over the top surface of said outer sickle section, said lower edge being substantially coextensive in length with said ledger element and terminating at a rear portion thereof clear of the mower bar; and means mounting said filler member on said wall and independently of the mower bar for vertical adjustment relative to said outer sickle section so as to selectively vary the vertical clearance between the lower edge of said member and the top surface of said outer sickle section.

2. The invention defined in claim 1, including: means separate from the filler member and mounted on the bar adjacent to the outer end thereof and engaging the sickle from above and at a location closely proximate to said wall for holding the outer sickle section downwardly relative to the ledger element.

3. The invention defined in claim 2, in which: said means includes a single hold-down member having a pair of hold-down fingers, one engaging the sickle at the location aforesaid and the other engaging the sickle from above and inwardly of said location aforesaid.

4. The invention defined in claim 1, in which: the means mounting the outer end of the bar on the shoe pad includes shim means for adjusting the bar vertically relative to the pad.

5. The invention defined in claim 1, in which: the filler member is a plate lying flatwise against the wall and having an aperture therethrough, the wall has a registering aperture, and the means mounting said member on the shoe includes a fastener passed through the apertures, one of said apertures being vertically elongated to permit said vertical adjustment.

References Cited in the file of this patent

UNITED STATES PATENTS

| 1,879,195 | Gray | Sept. 27, 1932 |
| 2,051,394 | Reever | Aug. 18, 1936 |

FOREIGN PATENTS

| 292,321 | Switzerland | Aug. 15, 1953 |